C. OQUIST.
PLOW.
APPLICATION FILED MAY 7, 1917.
1,268,051.
Patented May 28, 1918.
3 SHEETS—SHEET 1.
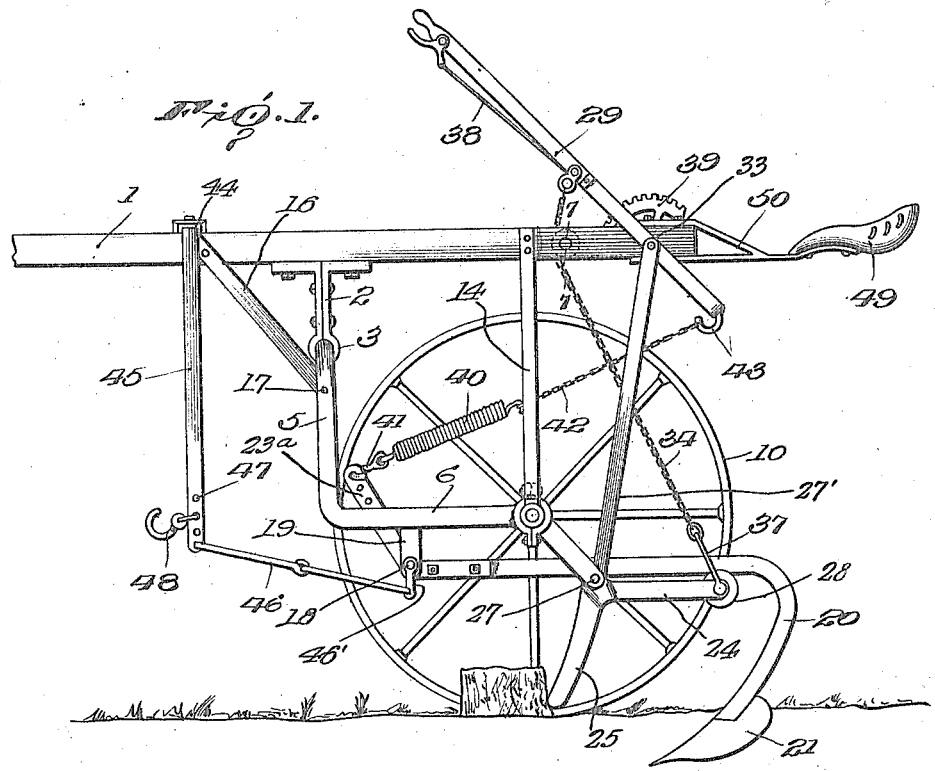
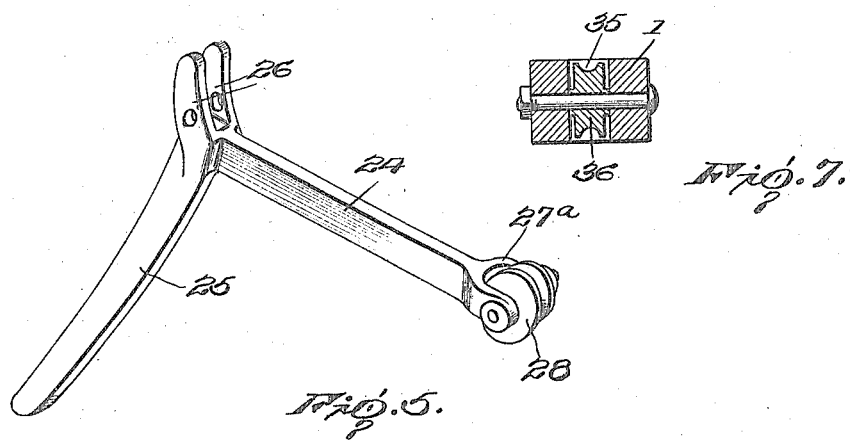
Inventor
Charles Oquist
By
[signature], Attorneys.

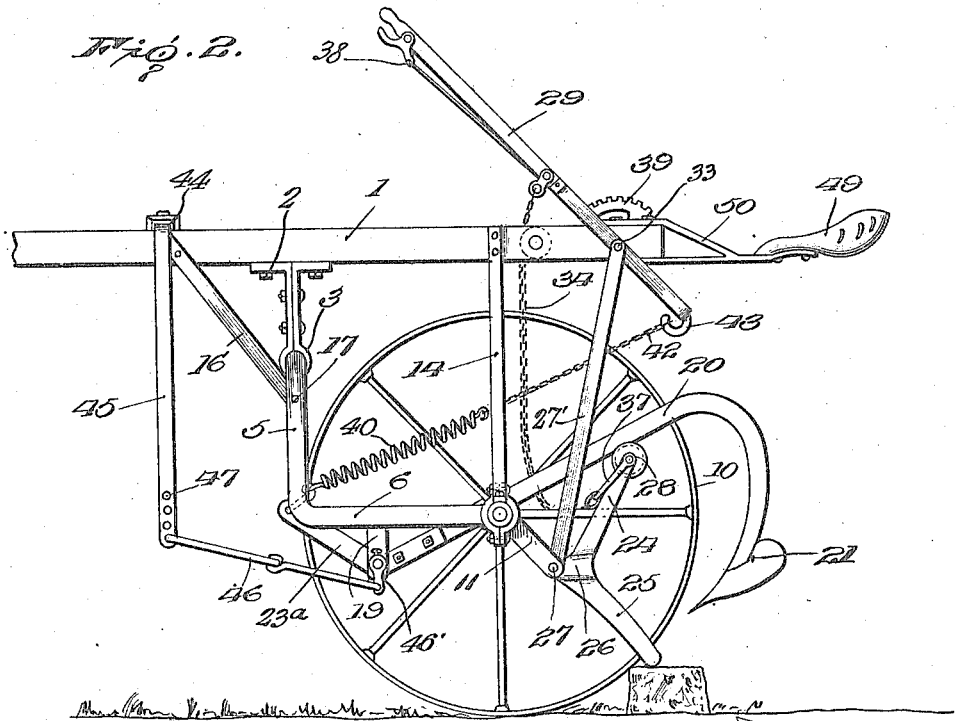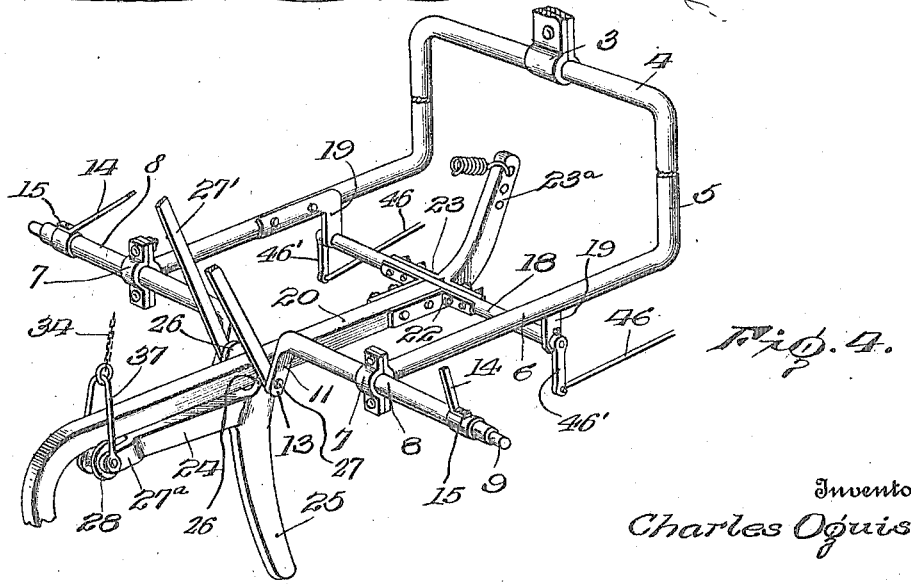

C. OQUIST.
PLOW.
APPLICATION FILED MAY 7, 1917.

1,268,051.

Patented May 28, 1918.
3 SHEETS—SHEET 3.

Inventor
Charles Oquist

By
Attorneys

UNITED STATES PATENT OFFICE.

CHARLES OQUIST, OF NEOSHO, MISSOURI.

PLOW.

1,268,051.

Specification of Letters Patent.

Patented May 28, 1918.

Application filed May 7, 1917. Serial No. 166,966.

*To all whom it may concern:*

Be it known that I, CHARLES OQUIST, a citizen of the United States, residing at Neosho, in the county of Newton and State of Missouri, have invented certain new and useful Improvements in Plows, of which the following is a specification.

This invention relates to riding plows and has as its primary object to provide a riding plow especially adapted for use in tilling newly cleared or stumpy or rocky soil, means being provided for automatically lifting the plowshare from the soil when a stump, stone, or other obstruction is met while plowing so as to avoid injury to the plowshare or to other parts of the plow and so as to obviate the necessity of driving around such obstructions and producing irregular furrows or the necessity of manually lifting the plow over the obstruction.

Another aim of the invention is to provide for manual adjustment of the plowshare to adapt the same to enter the soil to the desired depth without such adjustment, however, in any way interfering with the automatic lifting of the plowshare when an obstruction is encountered.

Another object of the invention is to provide means for firmly holding the plowshare in plowing position, the means being, however, yieldable to such a degree as not to interfere with the automatic lifting means and, incidentally, the invention contemplates so constructing and arranging the holding means that the same will in no way interfere with the manual adjustment of the plowshare when the manual lifting means is operated.

In the accompanying drawings:

Figure 1 is a side elevation of the plow embodying the present invention, the share being shown in plowing position;

Fig. 2 is a view similar to Fig. 1 illustrating the share raised in passing an obstruction;

Fig. 4 is a perspective view of the principal parts of the plow;

Fig. 5 is a perspective view of the device for automatically lifting the plowshare from the soil when an obstruction is encountered;

Fig. 7 is a detail vertical transverse sectional view taken substantially on the line 7—7 of Fig. 1.

Figure 3:
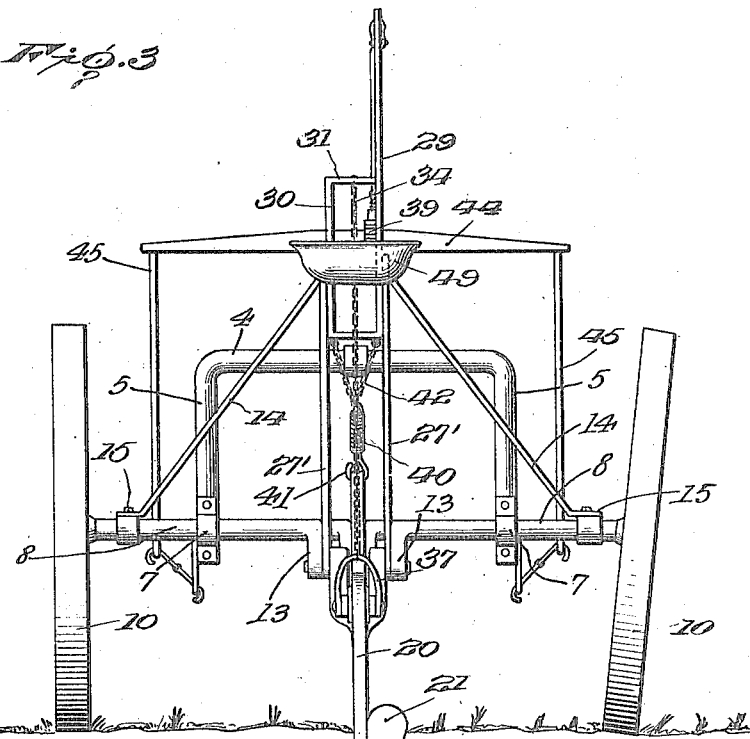
Fig. 3 is a rear elevation of the plow.
Figure 8:
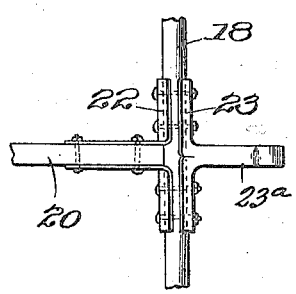
Figure 6:
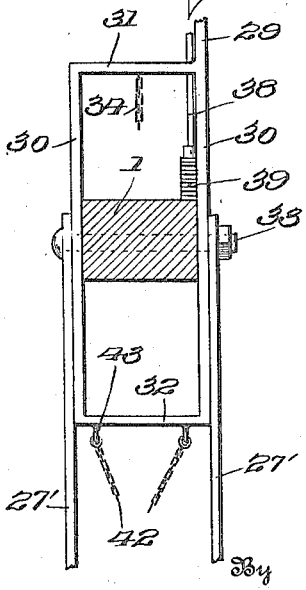
Fig. 6 is a rear elevation of the manually operable lever for lifting the share, the plow tongue being shown in section.

In the drawings, the numeral 1 indicates the plow tongue and secured to the underside of this tongue is a bracket 2 having a bearing portion 3 in which is fitted the intermediate portion 4 of a frame which includes side portions 5 which depend from the ends of the portion 4 and side portions 6 which extend rearwardly in parallel relation from the lower ends of the portions 5. At their rear ends the side portions 6 of the frame are provided with bearings 7 in each of which is mounted an axle member 8 having a spindle 9 at its outer end upon which is mounted the respective ground wheel, indicated by the numeral 10. Each axle member 8 inwardly of its bearing 7 is directed downwardly and rearwardly, as at 11, to provide spaced ears 13. In order to brace the members 8, braces 14 are secured at their lower ends, as at 15, to the said members and are inclined upwardly and secured to the opposite sides of the tongue 1. The frame comprising the members 4, 5 and 6 is braced by means of braces 16 secured at their rear ends, as at 17, to the members 5 of the frame and extended upwardly and inwardly and secured at their upper ends to the opposite sides of the tongue 1.

A shaft 18 is reduced at its ends and mounted in suitable bearing brackets 19 upon the side members 6 of the frame. The beam of the plow is indicated by the numeral 20 and the share by the numeral 21 and the said beam at its forward end is secured, as at 22, to the rear side of the shaft 18. Secured to the forward side of the said shaft, as at 23, is an upwardly and forwardly extending arm 23ª the purpose of which will be presently explained.

The means provided for automatically lifting the plow beam when an obstruction is met with comprises a rocker including an arm 24 and an arm 25, these arms extending respectively rearwardly and downwardly and being provided at their juncture with spaced upstanding ears 26 through which is passed a pivot bolt 27, this bolt passing also through the ears 13 whereby to support the rocker between the inner ends of the portions of the axle members 8. The rear end of the arm 24 of the rocker is bifurcated, as at 27ª, and mounted in the bifurcation is a grooved roller 28. By reference to Figs. 1, 2 and 4 of the drawings it will be observed that the plow beam 20 when in normal or plowing position extends between the ears 26 of the rocker and above the arm 24 and rests in the groove in the roller 28. It will also be observed that the arm 25 extends downwardly and slightly forwardly with its lower end located relatively close to the ground surface and therefore when an obstruction is met and the said arm 25 strikes the obstruction the rocker will be swung upon its pivot 27 to elevate the plow beam a sufficient distance to permit the share 21 to pass over the obstruction in the manner shown in Fig. 2 of the drawings. In this movement of the rocker and plow beam the roller 28 will, of course, ride along the lower edge of the beam, thereby decreasing the friction between these parts.

As before stated, means is provided whereby the plowshare may be manually raised out of the soil or adjusted so as to enter the soil to any desired depth and this means includes a lever, indicated in general by the numeral 29. The said lever has a rectangular frame portion including spaced parallel sides 30, an upper frame member 31, and a lower frame member 32 and the said frame is disposed to straddle a pivot bolt 33 which is passed through the tongue and through the side members 30 of the frame. Connected to the upper frame member 31 is a chain or other flexible connection 34 which extends downwardly through a slot 35 formed in the tongue 1 and about a pulley 36 which is mounted in the said slot and at its lower end this connection 34 is attached to a yoke 37 which straddles the plow beam and has its side members pivotally connected to the spindle for the grooved roller 28. The lever carries any suitable hand operated pawl device 38 for coaction with a segmental rack 39 upon the tongue 1. It will now be understood that when the lever is swung forwardly, as shown in Figs. 1 and 2 of the drawings, the plow beam will be lowered to occupy about the position shown in Fig. 1. By swinging the lever rearwardly the arm 24 of the rocker will be swung upwardly through the pull exerted by the connection 34 and as a result the plow beam will be swung upwardly a greater or less distance depending upon the depth to which it is desired the share shall enter the soil. It will be understood that while, as stated, the lever 29 may be manually operated for the purpose of raising or lowering the plow beam and, consequently, the plowshare to regulate the depth of the furrow, this manual adjustment does not in any way interfere with the automatic lifting of the share from the soil. In order to firmly and yet yieldably hold the plow beam in operative relation to the rocker constituting the means for automatically lifting the share, a spring 40 is connected at its forward end, as at 41, to the arm 23ᵃ and at its rear end to the forward ends of chains or other flexible connections 42 which in turn have their links selectively engaged with hooks 43 upon the lower frame member 32 of the lever. By referring now to Fig. 2 of the drawings it will be observed that when an obstruction is met with and the rocker is swung to elevate the plow beam 20, the manually operable lever 29 remains stationary and, consequently, the spring 40 is placed under additional tension resulting in the plow beam being quickly and positively lowered after the arm 25 has passed over the obstruction. It will be apparent, however, that while the spring 40 exerts normally a certain degree of tension to hold the plow beam in operative relation to the rocker and is placed under additional tension when the rocker arm 25 meets with an obstruction, nevertheless, when the lever 29 is manually operated to raise or lower the plow beam the tension of the spring 40 will not be increased for the reason that the lower end of the lever moves forwardly a distance corresponding to the distance to which the upper frame member 31 moves rearwardly. Thus in manually adjusting the plowshare it is only necessary to lift the weight of the plow beam and share as the spring 40 offers no resistance.

Secured upon the upper side of the tongue 1 is a cross piece 44 from the ends of which depend bars 45 and connected to the lower ends of these bars are jointed links or braces 46 which are also connected at their rear ends to arms 46' secured upon the ends of the shaft 18. Each of the bars 45 is provided with a series of openings 47 whereby clevises 48 may be adjustably connected therewith for the attachment of the draft animals.

The driver's seat, indicated by the numeral 49, is mounted upon a bracket 50 at the rear end of the tongue 1.

In order to brace the axle members 8, bars 27' are connected at their lower ends to the pin 27 and extend upwardly and are connected at their upper ends to the pivot bolt 33 for the hand lever.

Having thus described the invention, what is claimed as new is:

1. In a riding plow, a plowshare supporting member mounted for raising and lowering movement, a rocker having a member supporting the said plowshare supporting member and arranged to raise the same when the rocker is rocked in one direction, the rocker also including an obstruction engaging member, manually operable means connected with the rocker for actuating the same, and resilient connection between the manually operable means and the plowshare supporting member active to hold the said plowshare supporting member in operative relation to the first-mentioned member of the rocker and to be tensioned when the rocker is actuated by engagement with an obstruction, and inactive when the rocker is actuated through the manually operable means.

2. In a riding plow, a plow beam mounted for upward and downward swinging movement, and a rocker comprising one arm extending beneath the beam and arranged to ride thereon and lift the said beam when the rocker is moved upon its pivot in one direction and a second arm located in advance of the share supporting portion of the beam and forming an obstruction-engaging member.

3. In a riding plow, a plow beam mounted for upward and downward swinging movement, a rocker including an arm extending rearwardly beneath the beam and arranged to ride thereagainst and lift the said beam when the rocker is moved upon its pivot in one direction, and a downwardly extending obstruction engaging arm located in advance of the share supporting portion of the beam, and means yieldably holding the beam in coöperative relation to the rocker.

4. In a riding plow, a plow beam mounted for upward and downward swinging movement, a rocker including an arm extending beneath the beam and arranged to ride beneath and lift the said beam when the rocker is moved upon its pivot in one direction, the rocker including an obstruction engaging arm located in advance of the share supporting portion of the beam, the rocker coacting with the beam rearwardly of the pivot for the beam, a spring having connection with the beam forwardly of its pivot, and a fixed element to which the spring is also connected.

5. In a riding plow, a plow beam mounted for upward and downward swinging movement, a rocker including an arm extending beneath the beam and arranged to ride beneath and lift the said beam when the rocker is moved upon its pivot in one direction, the rocker including an obstruction engaging arm located in advance of the share supporting portion of the beam, the rocker coacting with the beam rearwardly of the pivot for the beam, a spring having connection with the beam forwardly of its pivot, a fixed element to which the spring is also connected, and a manually operable lever having operative connection with the rocker, the said spring having connection with the said lever.

6. In a riding plow, a plow beam mounted for upward and downward swinging movement, a rocker including an arm extending beneath the beam and arranged to ride beneath and lift the said beam when the rocker is moved upon its pivot in one direction, the rocker including an obstruction engaging arm located in advance of the share supporting portion of the beam, a manually operable lever, connection extending between the lever above its pivot for the beam supporting member of the rocker, the rocker coacting with the beam rearwardly of the pivot for the beam, and resilient yieldable connection between the beam forwardly of its pivot and the said lever below its pivot.

In testimony whereof I affix my signature.

CHARLES OQUIST. [L. s.]

Copies of this patent may be obtained for five cents each, by addressing the "Commissioner of Patents, Washington, D. C."